A. L. NELSON.
PISTON.
APPLICATION FILED MAR. 7, 1921.

1,409,757.

Patented Mar. 14, 1922.

Inventor
Adolph L. Nelson

By
Attorney

UNITED STATES PATENT OFFICE.

ADOLPH L. NELSON, OF INDIANAPOLIS, INDIANA.

PISTON.

1,409,757. Specification of Letters Patent. Patented Mar. 14, 1922.

Application filed March 7, 1921. Serial No. 450,191.

*To all whom it may concern:*

Be it known that I, ADOLPH L. NELSON, a citizen of the United States, residing at Indianapolis, in the county of Marion and State of Indiana, have invented certain new and useful Improvements in Pistons, of which the following is a specification.

My said invention consists in certain modifications in the construction of pistons forming the subject matter of my application No. 419,938, whereby a piston of somewhat similar type is provided but adapted for use where the piston pin is so high that the brace between the two separated portions of the piston, or between one flexible portion and its support, can not pass above the piston pin and connecting rod.

Referring to the accompanying drawings which are made a part hereof and on which similar reference characters indicate similar parts, Figure 1 is a sectional view through a piston constructed in accordance with my said invention, and Figures 2, 3, and 4 are modifications thereof.

In said construction the piston consists of the head 5, and a skirt 7 having a slot or opening 8 separating a portion 9 from the main body of the skirt, which portion 9 may be supported from the wrist-pin 10 on which the connecting rod 11 is mounted by a pin 14 interposed between said wrist-pin and a lug 13, to which it is connected by a screw-threaded connection and a nut 15. The end of said pin 14 passes through a slot 12 in the hub of the connecting rod 11 to permit of the operation.

Figure 1:
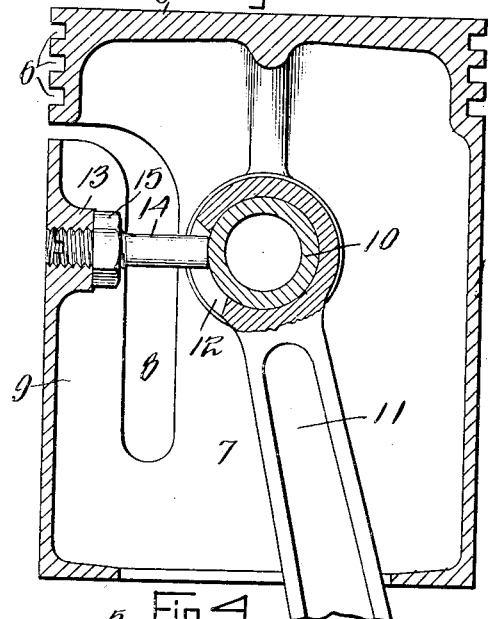
Figure 2:
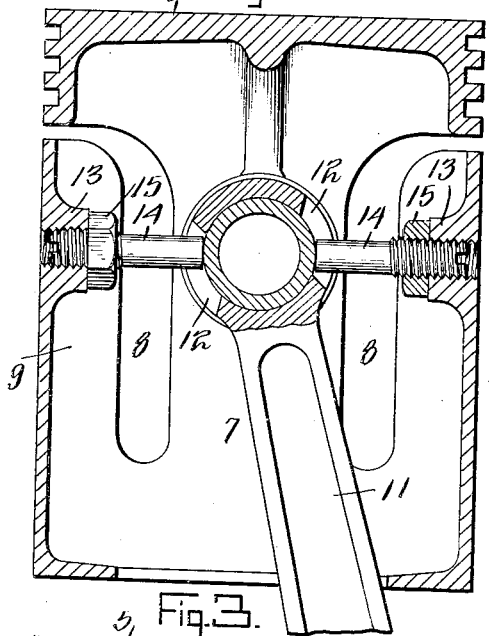
Figure 2 shows a construction similar to Figure 1 except that both sides of the piston are similarly formed.
Figure 3:
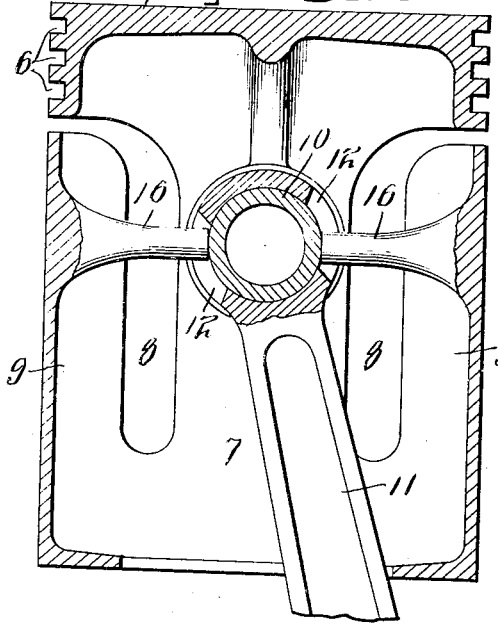
Figure 3 shows a construction similar to Figure 2 except that the lugs 16 are cast integral with the upper ends of the portions 9 and are not adjustable.
Figure 4:
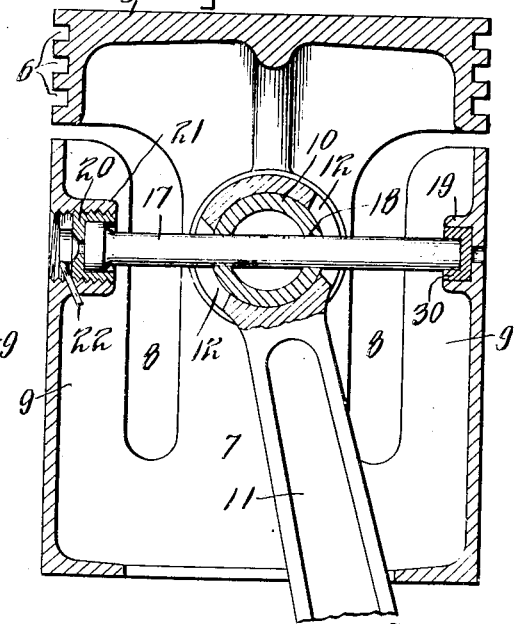

Figure 4 shows a construction wherein the parts are in the main similar except that the brace 17 is a separate piece and extends through an aperture 18 in the wrist-pin 10 and at one end is seated in a lug 19 having a bearing socket 30 of hardened metal thereon on one of the parts 9, and at its other end is seated in a screw-threaded plug 20 which is mounted in a screw-threaded perforation in a lug 21. A lock 22 is provided to secure said plug from movement after it is adjusted in place.

In operation the parts 9 of the piston are so adjusted in relation to the other parts of the skirt that they will fit snugly within the cylinder and expand and contract under the influence of the varying temperatures correspondingly to the contraction and expansion of the cylinder and thus maintain a close fit and avoid the "slap" of the piston which is a feature in common constructions and objectionable as is well understood.

Having thus fully described my said invention, what I claim as new and desire to secure by Letters Patent is:

1. A piston comprising a head and a skirt, a portion of the skirt being formed divided for a portion of the length of the skirt from the main body thereof and said divided portion having a brace interposed between the upper end thereof and the wrist-pin for supporting the same.

2. A piston comprising a head and a skirt, said skirt being formed with slits forming separated portions on opposite sides of the wrist-pin and adjustable braces interposed between said portions and said wrist-pin, substantially as set forth.

In witness whereof, I have hereunto set my hand and seal at Indianapolis, Indiana, this 22nd day of February, A. D. nineteen hundred and twenty-one.

ADOLPH L. NELSON.

Witnesses:
E. W. BRADFORD,
M. L. SHULER.